United States Patent
Delaney et al.

(10) Patent No.: US 10,951,933 B2
(45) Date of Patent: Mar. 16, 2021

(54) MEDIA STREAM RESUMPTION

(71) Applicant: Lenovo (Singapore) Pte. Ltd., Singapore (SG)

(72) Inventors: Mark Patrick Delaney, Raleigh, NC (US); Nathan J. Peterson, Oxford, NC (US); Russell Speight VanBlon, Raleigh, NC (US); John Carl Mese, Cary, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/460,412

(22) Filed: Jul. 2, 2019

(65) Prior Publication Data
US 2021/0006846 A1   Jan. 7, 2021

(51) Int. Cl.
H04N 21/2387   (2011.01)
H04N 21/234    (2011.01)
G06K 9/00      (2006.01)

(52) U.S. Cl.
CPC ..... *H04N 21/2387* (2013.01); *G06K 9/00765* (2013.01); *H04N 21/23418* (2013.01)

(58) Field of Classification Search
CPC .............. H04N 21/2387; H04N 21/23418
See application file for complete search history.

(56) References Cited

U.S. PATENT DOCUMENTS

2019/0149889 A1*  5/2019  Agarwal ............ H04N 21/4882
                                                  725/14
2019/0238928 A1*  8/2019  Filmeyer ........... H04N 21/4333

* cited by examiner

*Primary Examiner* — Yassin Alata
(74) *Attorney, Agent, or Firm* — Ference & Associates LLC

(57) ABSTRACT

One embodiment provides a method, including: receiving, at an information handling device, an indication to resume a media stream; determining, using a processor, a stoppage period associated with the media stream; identifying, based at least in part on the stoppage period, a resume point in the media stream; and resuming, based on the identifying, the media stream from the resume point. Other aspects are described and claimed.

20 Claims, 4 Drawing Sheets

MEDIA STREAM RESUMPTION

BACKGROUND

Individuals frequently consume media content on their information handling devices ("devices"), for example, smart phones, tablet devices, televisions, laptop and/or personal computers, and the like. For instance, many individuals are subscribed to one or more media-streaming services ("services") that contain hundreds of available movies and/or television shows that they may watch. Through their devices, these individuals may choose an available media option from the service and watch it at their preferred rate and/or time.

BRIEF SUMMARY

In summary, one aspect provides a method, comprising: receiving, at an information handling device, an indication to resume a media stream; determining, using a processor, a stoppage period associated with the media stream; identifying, based at least in part on the stoppage period, a resume point in the media stream; and resuming, based on the identifying, the media stream from the resume point.

Another aspect provides an information handling device, comprising: a processor; a memory device that stores instructions executable by the processor to: receive an indication to resume a media stream; determine a stoppage period associated with the media stream; identify, based at least in part on the stoppage period, a resume point in the media stream; and resume, based on the identifying, the media stream from the resume point.

A further aspect provides a product, comprising: a storage device that stores code, the code being executable by a processor and comprising: code that receives an indication to resume a media stream; code that determines a stoppage period associated with the media stream; code that identifies, based at least in part on the stoppage period, a resume point in the media stream; and code that resumes, based on the identifying, the media stream from the resume point.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
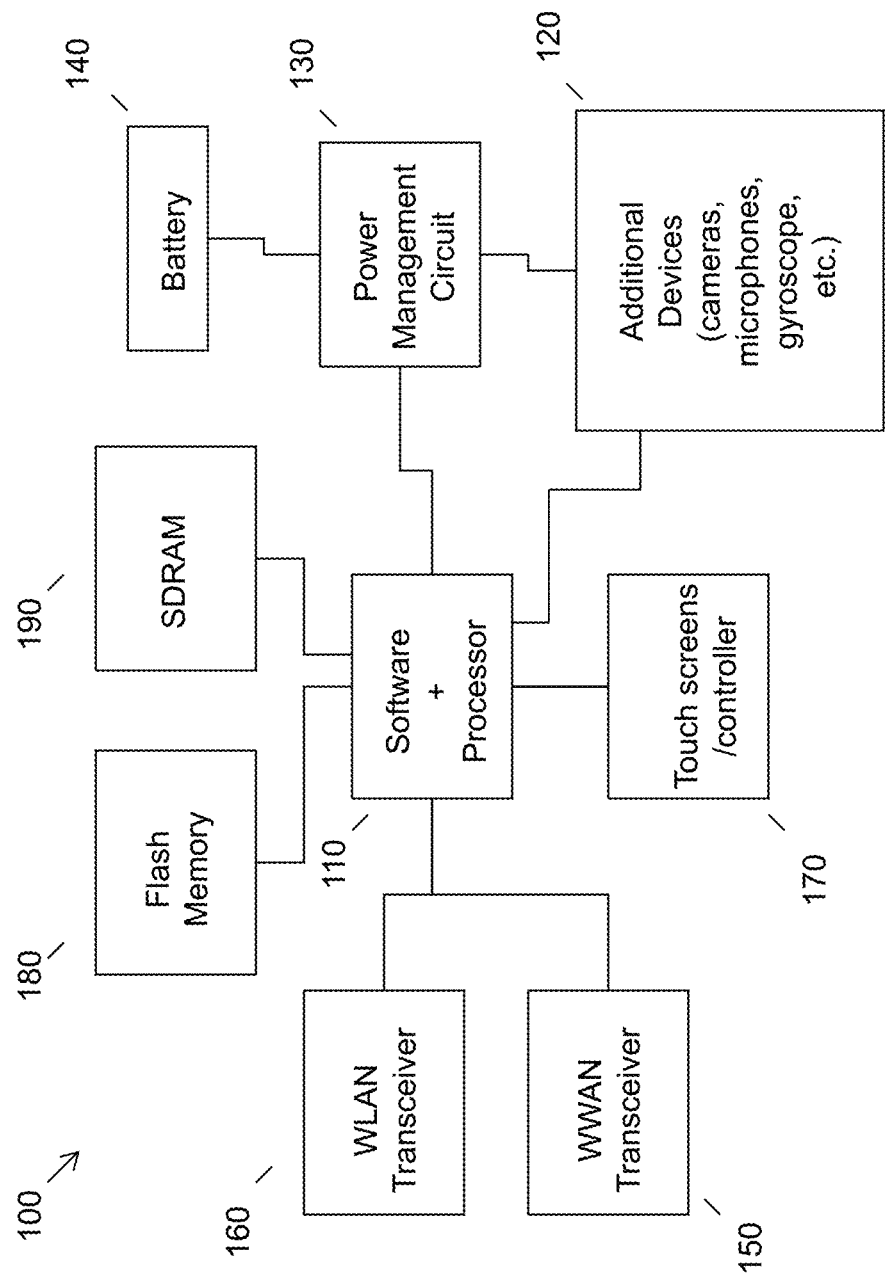
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users today have a wide range of control over the media that they consume. For example, when interacting with a media-streaming service ("service") a user may: select the type of media they want to consume, start the media at a preferred time, stop the media at any point in the stream, and restart it whenever they are ready to re-engage with the media. Prior to restart, conventional systems may offer the user a choice to restart the media from the beginning or to resume the media from a resume point. The resume point may be dynamically selected by the system and may correspond to a point equivalent to the stop point or, alternatively, may correspond to a previous point that is a predetermined time before the stop point (e.g., 10 seconds ahead of/before the stop point, etc.).

Restarting media at a previous point may be useful to users at it provides them with some context regarding what is going on in the media near the point at which it was stopped. However, the conventional methods of selecting this previous point are rarely perfect. For example, the previous point in some existing systems may always be a fixed number of seconds before the stop point, regardless of when the media was last played. This may be problematic if a long period of time has elapsed since the user last interacted with the media. More particularly, the previous point may not be far enough before the stop point to provide the user with enough context to fully understand what is going on. In a similar issue, if a user wanted to resume media they had only just recently stopped, then they may not need the previous point to be far before the stop point because they have a good understanding of what is going on in the media around the stop point.

Another issue may occur when the previous point falls in the middle of a scene (e.g., a dialogue exchange, an action sequence, etc.). In this situation, the user may be thrust into the action with little to no context with what is going on. Such a situation may force the user to manually maneuver through the media stream to select a better restart point (e.g., a restart point at the beginning of a scene, etc.), which may be burdensome and time-consuming.

Accordingly, an embodiment provides a method for resuming a media stream at an intelligently selected previous point based at least in part on a stoppage period associated with the media stream. In an embodiment, an indication to resume a media stream may be received at a device. An embodiment may then determine a stoppage period associated with the media stream. As used herein, the stoppage period may be a period of time since the media stream was last stopped or interacted with by a user. Thereafter, an embodiment may utilize to the stoppage period to identify a resume point. The resume point may be a point in the media stream before a stoppage point and the identification of which may be based solely on the stoppage period or, alternatively, may be based on additional considerations as well (e.g., scene segment identification, user profiles, etc.). Responsive to identifying the resume point, an embodiment may resume the media stream from that point. Such a method may provide a better way for selecting a resume point by incorporating various types of context data.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, etc. System 100 often includes one or more touch screens 170 for data input and display/rendering. System 100 also typically includes various memory devices, for example flash memory 180 and SDRAM 190.

Figure 2:
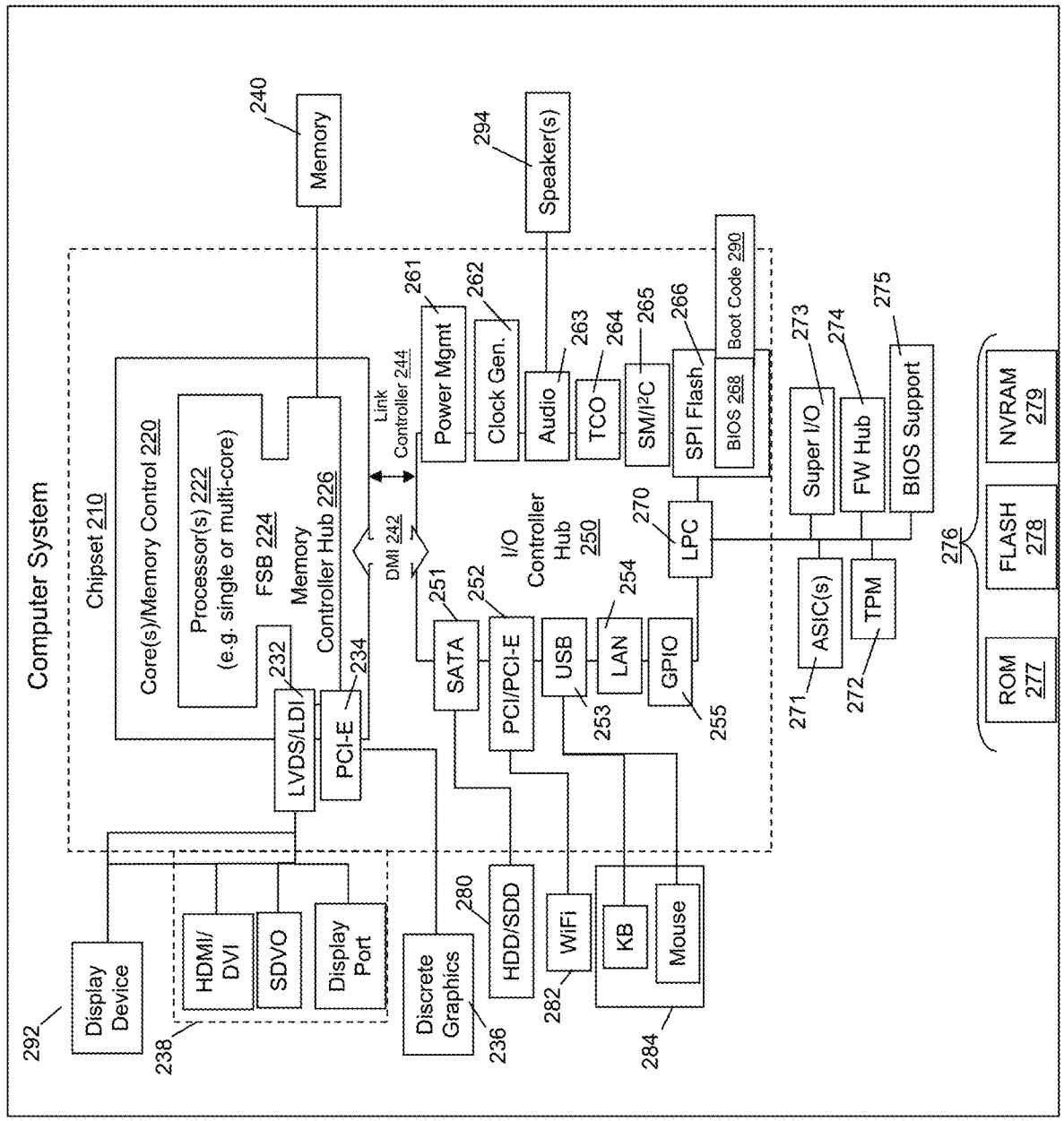
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, smart TVs, laptops, and/or other electronic devices that may be able to support media streams or provide media output. For example, the circuitry outlined in FIG. 1 may be implemented in a tablet or smart phone embodiment, whereas the circuitry outlined in FIG. 2 may be implemented in a laptop.

Figure 3:
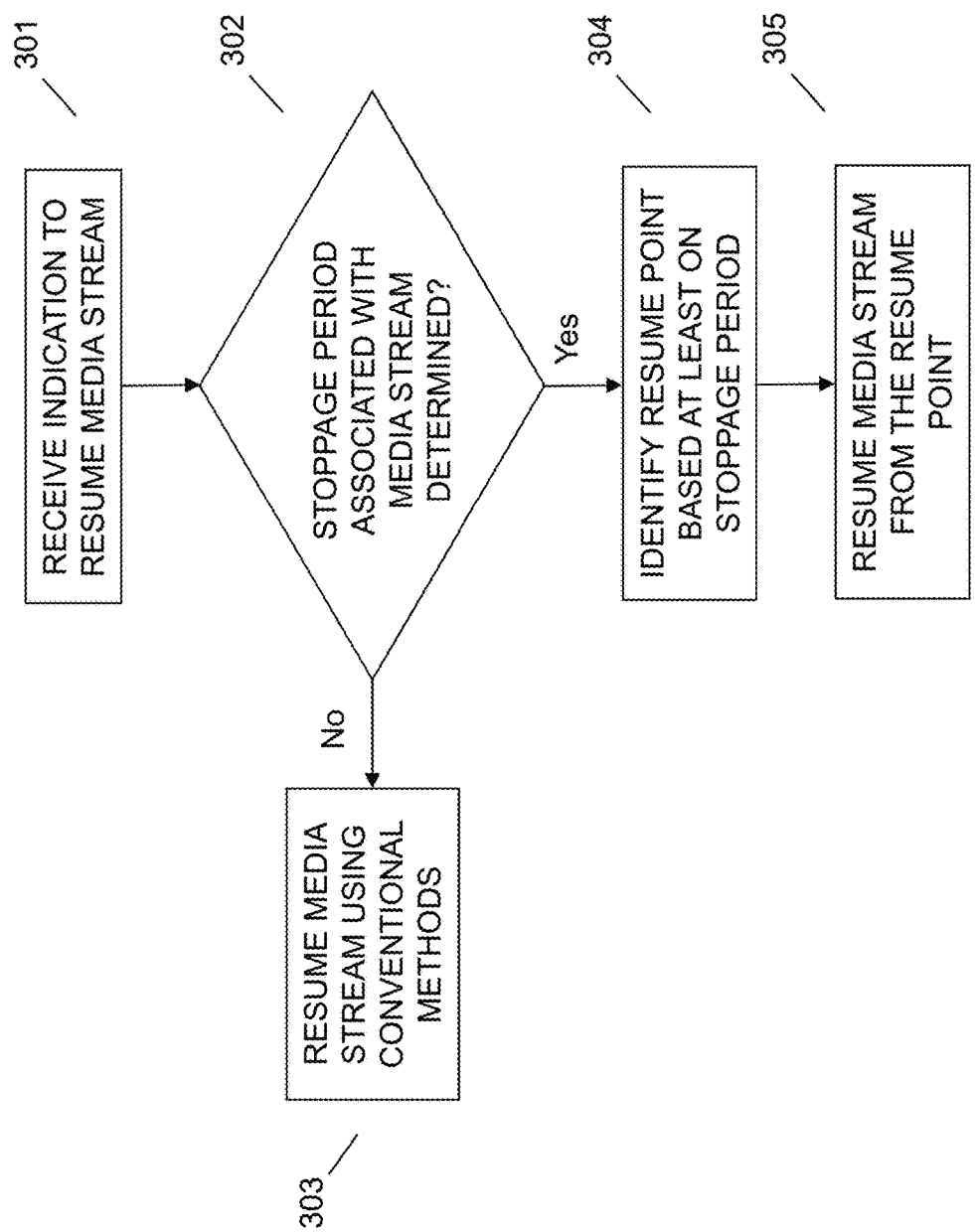
FIG. 3 illustrates an example method of resuming a media stream from a point based at least in part on a determined decay factor.

Referring now to FIG. 3, an embodiment may dynamically select a resume point in a media stream that is better fitted to a user's contextual situation. At 301, an embodiment may receive an indication to resume a media stream. In an embodiment, the media stream may refer to a broad array of one or more media objects (e.g., video objects, audio objects, a combination thereof, etc.) that may be played on a device. For example, the media stream may refer to a downloaded song stored locally on the device, a movie played by the device but stored on a computer readable medium (e.g., a digital versatile disk (DVD), etc.), an episode of a television show stored on a remote server and accessed by a user via an online streaming service, and the like.

In an embodiment, the indication may be an explicit, user-provided indication. For example, when presented with a choice to restart or resume a media stream, a user may select the latter option. As another example, a user may select/open a media object that they have previously started and stopped and the selection alone may the basis for the indication. In yet another example, the indication may not require any explicit user input and may be detected passively by detecting a user's presence (e.g., using one or more image, audio, and/or motion sensors, etc.) in a predetermined area (e.g., in front of their device, etc.). A skilled person in the art will recognize that other types of indications for resuming a media stream, not explicitly mentioned here, may also be received.

At 302, an embodiment may determine a stoppage period associated with the media stream. In the context of this application, a stoppage period may refer to a period of time since a user last interacted with the media stream (e.g., since the media stream was paused or stopped, etc.). In an embodiment, each time a media stream is stopped, a time associated with the stoppage point may be identified and stored (e.g., locally on the device, at a remote storage location, etc.). Subsequently, an embodiment may identify the time when the indication at 301 is received and thereafter determine the stoppage period from the difference between these two data points. The foregoing is a non-limiting example method of determining the stoppage period. Other methods for conducting the determination, not explicitly mentioned here, may also be utilized.

Responsive to not determining, at 302, a stoppage period, an embodiment may, at 303, resume the media stream using a conventional method. Additionally or alternatively, an embodiment may generate a notification that the stoppage period could not be identified. Conversely, responsive to determining, at 302, a stoppage period, an embodiment may automatically, at 304, identify a resume point based at least in part on the stoppage period. In an embodiment, the resume point may be a predetermined time period before the stoppage point (e.g., a predetermined number of seconds, minutes, a combination thereof, etc.). Once a resume point is identified, at 304, an embodiment may resume, at 305, the media steam from the identified resume point.

Figure 4:
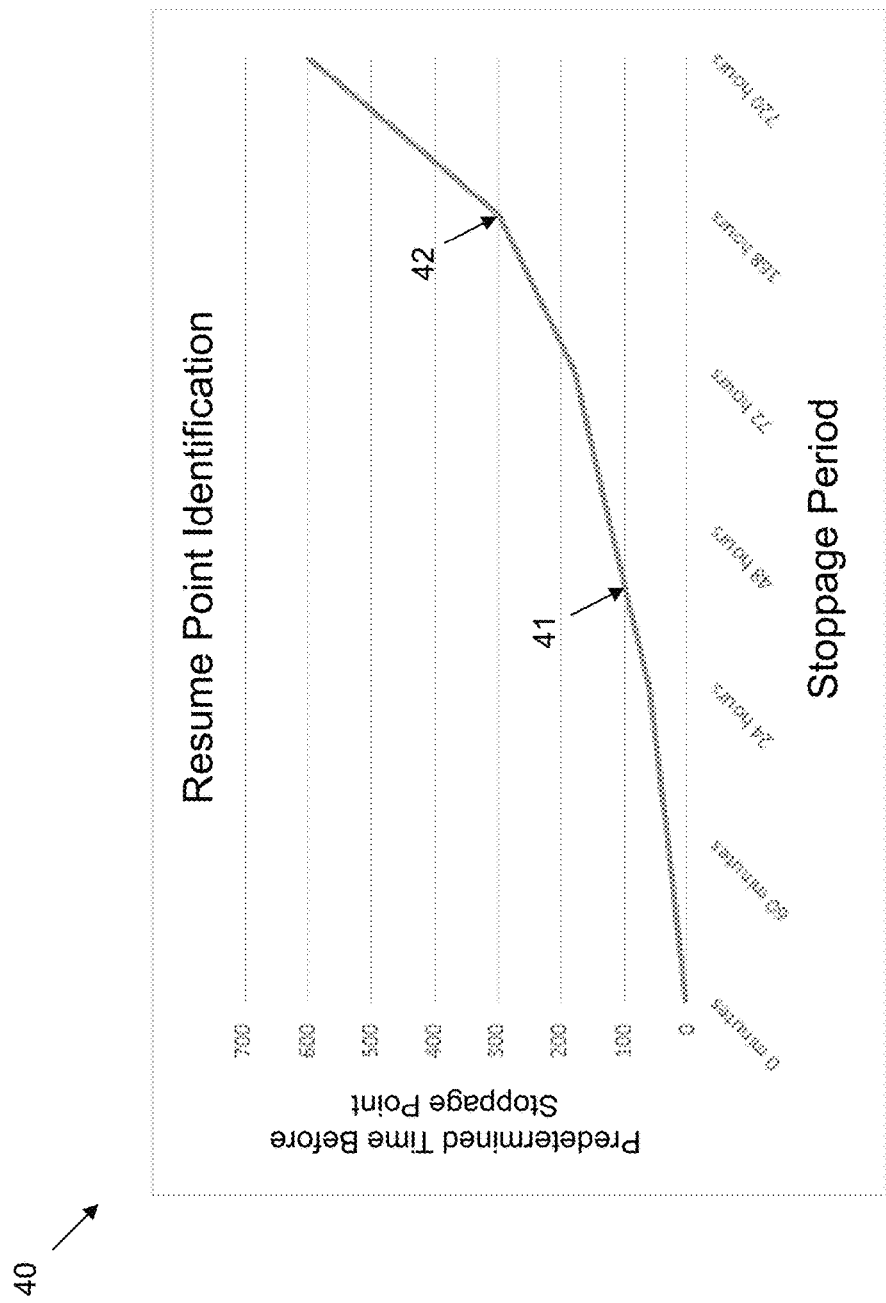
FIG. 4 illustrates an example graphical representation of correlations between interaction intervals and pre-emptive rewind times.

In an embodiment, the identification of the resume point may be based solely on the stoppage period. In this situation, an embodiment may refer to an accessible database (e.g., stored locally on the device, stored on another device or remote database, etc.) comprising correlations between the stoppage period and the aforementioned predetermined time period. For example, referring now to FIG. 4, an example graphical illustration is provided that identifies correlations between various stoppage periods and predetermined time periods. As can be seen from the graph 40, when a stoppage period is determined to be approximately 48 hours, a corresponding resume point 41 may be set 100 seconds behind the stoppage point. As another example, when a stoppage period is determined to be 168 hours (i.e., one week), a corresponding resume point 42 may be set 300 seconds behind the stoppage point. In an embodiment, each predetermined time point may be set by a manufacturer and/or adjusted by a user. Alternatively, the predetermined time points may be identified via other means (e.g., by a seed equation, from crowdsourced data, etc.).

In an embodiment, when a stoppage period exceeds a maximum stoppage period threshold (e.g., over 720 hours, etc.), an embodiment may provide a suggestion to the user to restart the media from the beginning. Alternatively, an embodiment may dynamically set the resume point in this situation to be equivalent with the beginning of the media. Additionally or alternatively, in another embodiment, when a stoppage period does not exceed a minimum stoppage period threshold (e.g., 1 minute, etc.), the resume point may be equivalent to the stoppage point.

In an embodiment, other factors, in addition to the stoppage period, may also be considered when identifying a resume point. For instance, in an embodiment, a plurality of segments may be detected in the media stream. The segments may be detected using one or more conventional segment detection techniques. Each segment may be associated with a unique scene (e.g., a dialogue exchange, an action sequence, etc.). In an embodiment, if a resume point based on the stoppage period is identified to fall somewhere in the middle of a segment, an embodiment may further adjust the resume point back to start at the beginning of the segment. For example, and with reference to FIG. 4, if a stoppage period was approximately 48 hours, a projected resume point would be set approximately 100 seconds before the stoppage point. If the point 100 seconds before the stoppage point is identified to fall somewhere in the middle of a segment, an embodiment may dynamically set the resume point to the beginning of the segment.

In another embodiment, a user's age group may be considered when identifying a resume point. More particularly, a user falling into an older age group may need additional context whereas a user falling into a younger age group may not need as much context. In an embodiment, each age group may be assigned a particular distortion time that may be considered when identifying the resume point. The distortion time may add or subtract time from the predetermined time point before the stoppage point. As an example and with reference to FIG. 4, if a stoppage period was approximately 48 hours, a standard resume point would be set approximately 100 seconds before the stoppage point. If an embodiment is able to identify that a user is associated with an older age group having a distortion time of +30 seconds, then the resume point may be set 130 seconds before the stoppage point.

Situations often arise where two or more users are simultaneously engaged with the same media stream. For example, two individuals may be watching a movie or a TV show together. If a stoppage point differs between at least two users (e.g., because one user stopped watching the media stream before another, etc.) embodiments of the underlying application may utilize one or more user identification techniques to set separate resume points based on user identity. For example, an embodiment may first identify that User A and User B were both simultaneously watching Movie C. An embodiment may then identify that User A stopped watching Movie C at Time 1 and that User B stopped watching Movie C at Time 2, where Time 1 is different from Time 2. Assuming that the stoppage time is equivalent for both User A and User B, an embodiment may identify different resume points for each user when each resumes the movie.

The various embodiments described herein thus represent a technical improvement to conventional media resumption techniques. Using the techniques described herein, an embodiment may receive an indication to resume a media stream. An embodiment may then determine a stoppage period associated with the media stream. The stoppage period may be associated with a period of elapsed time since the media stream was stopped. Thereafter, an embodiment may identify, based at least in part on the stoppage period, a resume point in the media stream to restart the media from. Such a method may provide more appropriate context to users when they decide to resume a media stream.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an information handling device, an indication to resume a media stream from a stoppage point;
   determining, using a processor, a stoppage period associated with the media stream;
   ascertaining, using available context data, an age group associated with a user;
   associating, based on the ascertaining, a distortion time with the age group;
   identifying, based at least in part on a combination of the stoppage period and the distortion time, a resume point in the media stream, wherein the identifying the resume point comprises:
      associating a length of time with the stoppage period;
      associating another length of time with the distortion time;
      combining the length of time with the another length of time to form a total time; and
      identifying the resume point by subtracting the total time from the stoppage point; and
   resuming, based on the identifying, the media stream from the resume point.

2. The method of claim 1, wherein the media stream is associated with at least one of: a video stream and an audio stream.

3. The method of claim 1, wherein the resume point is a predetermined time period before the stoppage point.

4. The method of claim 3, wherein the identifying the resume point comprises accessing a data store comprising a correlation between the stoppage period and the predetermined time period.

5. The method of claim 4, wherein the stoppage period is representative of an elapsed period of time since the stoppage point.

6. The method of claim 1, wherein the identifying comprises automatically identifying the point without receiving additional user input.

7. The method of claim 1, further comprising detecting a plurality of segments in the media stream.

8. The method of claim 7, wherein each of the plurality of segments is associated with a unique scene.

9. The method of claim 7, wherein the identifying comprises recognizing, based on the stoppage period, that the resume point corresponds to a point in a segment from the plurality of segments.

10. The method of claim 9, further comprising adjusting the resume point to be associated with a beginning point of the segment.

11. An information handling device, comprising:
a processor;
a memory device that stores instructions executable by the processor to:
receive an indication to resume a media stream from a stoppage point;
determine a stoppage period associated with the media stream;
ascertain, using available context data, an age group associated with a user;
associate, based on the ascertaining, a distortion time with the age group;
identify, based at least in part on a combination of the stoppage period and the distortion time, a resume point in the media stream, wherein the instructions executable by the processor to identify comprise instructions executable by the processor to:
associate a length of time with the stoppage period;
associate another length of time with the distortion time;
combine the length of time with the another length of time to form a total time; and
identify the resume point by subtracting the total time from the stoppage point; and
resume, based on the identifying, the media stream from the resume point.

12. The information handling device of claim 11, wherein the media stream is associated with at least one of: a video stream and an audio stream.

13. The information handling device of claim 11, wherein the resume point is a predetermined time period before the stoppage point.

14. The information handling device of claim 13, wherein the instructions executable by the processor to identify the resume point comprise instructions executable by the processor to access a data store comprising a correlation between the stoppage period and the predetermined time period.

15. The information handling device of claim 14, wherein the stoppage period is representative of an elapsed period of time since the stoppage point.

16. The information handling device of claim 11, wherein the instructions are further executable by the processor to detect a plurality of segments in the media stream.

17. The information handling device of claim 16, wherein each of the plurality of segments is associated with a unique scene.

18. The information handling device of claim 16, wherein the instructions executable by the processor to identify comprise instructions executable by the processor to recognize, based on the stoppage period, that the resume point corresponds to a point in a segment from the plurality of segments.

19. The information handling device of claim 18, wherein the instructions are further executable by the processor to adjust the resume point to be associated with a beginning point of the segment.

20. A product, comprising:
a storage device that stores code, the code being executable by a processor and comprising:
code that receives an indication to resume a media stream from a stoppage point;
code that determines a stoppage period associated with the media stream;
code that ascertains, using available context data, an age group associated with a user;
code that associates, based on the code that ascertains, a distortion time with the age group;
code that identifies, based at least in part on a combination of the stoppage period and the distortion time, a resume point in the media stream, wherein the code that identifies comprises:
code that associates a length of time with the stoppage period;
code that associates another length of time with the distortion time;
code that combines the length of time with the another length of time to form a total time; and
code that identifies the resume point by subtracting the total time from the stoppage point; and
code that resumes, based on the identifying, the media stream from the resume point.

* * * * *